(12) United States Patent
Bish et al.

(10) Patent No.: US 8,618,222 B2
(45) Date of Patent: Dec. 31, 2013

(54) CURABLE FLUOROELASTOMER COMPOSITION

(75) Inventors: Christopher J Bish, Kennett Square, PA (US); Peter A Morken, Wilmington, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 124 days.

(21) Appl. No.: 13/417,389

(22) Filed: Mar. 12, 2012

(65) Prior Publication Data
US 2013/0066018 A1 Mar. 14, 2013

Related U.S. Application Data

(60) Provisional application No. 61/469,873, filed on Mar. 31, 2011.

(51) Int. Cl.
C08F 8/00 (2006.01)
C08F 8/30 (2006.01)
C08F 14/18 (2006.01)
C08C 19/22 (2006.01)

(52) U.S. Cl.
USPC .............. 525/326.3; 525/326.1; 525/326.2; 525/377

(58) Field of Classification Search
USPC .................. 525/326.3, 326.2, 326.1, 377
See application file for complete search history.

(56) References Cited

U.S. PATENT DOCUMENTS

| 4,281,092 A | 7/1981 | Breazeale |
|---|---|---|
| 4,394,489 A | 7/1983 | Aufdermarsh et al. |
| 5,605,973 A | 2/1997 | Yamamoto |
| 5,637,648 A | 6/1997 | Saito et al. |
| 5,668,221 A | 9/1997 | Saito et al. |
| 5,789,489 A | 8/1998 | Coughlin et al. |
| 5,789,509 A | 8/1998 | Schmiegel et al. |
| 6,281,296 B1 | 8/2001 | MacLachlan et al. |
| 6,638,999 B2 | 10/2003 | Bish |
| 7,300,985 B2 | 11/2007 | Grootaert et al. |
| 2005/0143529 A1* | 6/2005 | Grootaert ............... 525/326.2 |
| 2006/0135700 A1* | 6/2006 | Grootaert et al. ......... 525/326.2 |
| 2011/0009569 A1 | 1/2011 | Grootaert et al. |

FOREIGN PATENT DOCUMENTS

| WO | 0159005 A2 | 8/2001 |
|---|---|---|
| WO | 2005066254 A1 | 7/2005 |
| WO | 2011084404 A1 | 7/2011 |
| WO | 2012077583 A1 | 6/2012 |

OTHER PUBLICATIONS

Nternational Search Report of corresponding PCT/US2012/031717 case: European Patent Office in Rijswijk, NL, Authorized Officer Hermann Engel, Sep. 25, 2012.

* cited by examiner

*Primary Examiner* — Randy Gulakowski
*Assistant Examiner* — Kara Boyle

(57) ABSTRACT

Fluoroelastomer compositions comprising fluoroelastomers having copolymerized units of a nitrile group-containing cure site monomer are cured with certain hydroxylamine derivatives. The hydroxylamine derivative is of formula $R^1(C(O))_n NHOR^2$ wherein n is 0 or 1; $R^1$ is H, $C(O)R^3$, $C(O)R^4$, $C(O)OR^3$, or $C(O)SR^3$; $R^2$ is H, $C(O)R^3$, or $C(O)OR^3$; $R^3$ is $C_1$-$C_{20}$ alkyl group, aryl, heterocycle, benzyl, 9-fluorenylmethyl, or $CH_2R^4$; and $R^4$ is a fluoroalkyl group, with the proviso that $R^1$ and $R^2$ cannot simultaneously be H.

10 Claims, No Drawings

CURABLE FLUOROELASTOMER COMPOSITION

CROSS-REFERENCE TO RELATED APPLICATIONS

This application claims the benefit of U.S. Provisional Application No. 61/469,873 filed Mar. 31, 2011.

FIELD OF THE INVENTION

This invention relates to curable fluoroelastomer compositions and more particularly to fluoroelastomer compositions containing certain hydroxylamine derivatives as curing agents.

BACKGROUND OF THE INVENTION

Fluoroelastomers have achieved outstanding commercial success and are used in a wide variety of applications in which severe environments are encountered, in particular those end uses where exposure to high temperatures and aggressive chemicals occurs. For example, these polymers are often used in seals for aircraft engines, in oil-well drilling devices, and in sealing elements for industrial equipment that operates at high temperatures.

The outstanding properties of fluoroelastomers are largely attributable to the stability and inertness of the copolymerized fluorinated monomer units that make up the major portion of the polymer backbones in these compositions. Such monomers include vinylidene fluoride, hexafluoropropylene, tetrafluoroethylene and perfluoro(alkyl vinyl) ethers. In order to develop elastomeric properties fully, fluoroelastomers are typically crosslinked, i.e. vulcanized. To this end, a small percentage of cure site monomer is copolymerized with the fluorinated monomer units. Cure site monomers containing at least one nitrile group, for example perfluoro-8-cyano-5-methyl-3,6-dioxa-1-octene, are especially preferred. Such compositions are described in U.S. Pat. Nos. 4,281,092; 4,394,489; 5,789,489; 5,789,509 and in WO 2011084404.

Bisamidoximes (U.S. Pat. No. 5,668,221) and bisamidrazones (U.S. Pat. Nos. 5,605,973; 5,637,648) have been used as vulcanizing agents for fluoroelastomers having nitrile group cure sites. These cures may be scorchy, i.e. crosslinking may begin before the final shaping of the composition. Also, the curatives require complex, multistep syntheses from expensive starting materials.

Other nitrogen containing nucleophilic compounds have been employed to crosslink fluoroelastomers having nitrile group cure sites (U.S. Pat. No. 6,638,999 B2). Some of these curatives are scorchy while others are volatile at rubber milling temperatures.

Fluoropolymers having pendant amidrazone or amidoxime groups are also known (U.S. Pat. No. 7,300,985 B2). These polymers require an additional polymer modification step in order to form crosslinks.

SUMMARY OF THE INVENTION

The present invention is directed to curable fluoroelastomer compositions which comprise a fluoroelastomer having nitrile group cure sites and certain hydroxylamine derivatives as curatives. More specifically, the present invention is directed to a curable composition comprising:

A. a fluoroelastomer comprising copolymerized units of a nitrile group-containing cure site monomer; and B. an hydroxylamine derivative of formula $R^1(C(O))_n NHOR^2$ wherein n is 0 or 1; $R^1$ is H, $C(O)R^3$, $C(O)R^4$, $C(O)OR^3$, or $C(O)SR^3$; $R^2$ is H, $C(O)R^3$, or $C(O)OR^3$; $R^3$ is $C_1$-$C_{20}$ alkyl group, aryl, heterocycle, benzyl, 9-fluorenylmethyl, or $CH_2R^4$; and $R^4$ is a fluoroalkyl group, with the proviso that $R^1$ and $R^2$ cannot simultaneously be H.

Another aspect of the present invention is a cured article formed from the above composition.

DETAILED DESCRIPTION OF THE INVENTION

The fluoroelastomer that may be employed in the composition of the invention may be partially fluorinated or perfluorinated. Fluoroelastomers preferably contain between 25 and 70 weight percent, based on the total weight of the fluoroelastomer, of copolymerized units of a first monomer which may be vinylidene fluoride ($VF_2$) or tetrafluoroethylene (TFE). The remaining units in the fluoroelastomers are comprised of one or more additional copolymerized monomers, different from said first monomer, selected from the group consisting of fluoromonomers, hydrocarbon olefins and mixtures thereof. Fluoromonomers include fluorine-containing olefins and fluorine-containing vinyl ethers.

Fluorine-containing olefins which may be employed to make fluoroelastomers include, but are not limited to vinylidene fluoride ($VF_2$), hexafluoropropylene (HFP), tetrafluoroethylene (TFE), 1,2,3,3,3-pentafluoropropene (1-HPFP), 1,1,3,3,3-pentafluoropropene (2-HPFP), chlorotrifluoroethylene (CTFE) and vinyl fluoride.

Fluorine-containing vinyl ethers that may be employed to make fluoroelastomers include, but are not limited to perfluoro(alkyl vinyl) ethers. Perfluoro(alkyl vinyl) ethers (PAVE) suitable for use as monomers include those of the formula

$$CF_2=CFO(R_fO)_n(R_{f'}O)_mR_f \qquad (I)$$

where $R_f$ and $R_{f'}$ are different linear or branched perfluoroalkylene groups of 2-6 carbon atoms, m and n are independently 0-10, and $R_f$ is a perfluoroalkyl group of 1-6 carbon atoms.

A preferred class of perfluoro(alkyl vinyl) ethers includes compositions of the formula

$$CF_2=CFO(CF_2CFXO)_nR_f \qquad (II)$$

where X is F or $CF_3$, n is 0-5, and $R_f$ is a perfluoroalkyl group of 1-6 carbon atoms.

A most preferred class of perfluoro(alkyl vinyl) ethers includes those ethers wherein n is 0 or 1 and $R_f$ contains 1-3 carbon atoms. Examples of such perfluorinated ethers include perfluoro(methyl vinyl ether) (PMVE), perfluoro(ethyl vinyl ether) (PEVE) and perfluoro(propyl vinyl ether) (PPVE). Other useful monomers include those of the formula

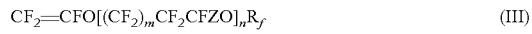

$$CF_2=CFO[(CF_2)_mCF_2CFZO]_nR_f \qquad (III)$$

where $R_f$ is a perfluoroalkyl group having 1-6 carbon atoms, m=0 or 1, n=0-5, and Z=F or $CF_3$. Preferred members of this class are those in which $R_f$ is $C_3F_7$, m=0, and n=1.

Additional perfluoro(alkyl vinyl) ether monomers include compounds of the formula

$$CF_2=CFO[(CF_2CF\{CF_3\}O)_n(CF_2CF_2CF_2O)_m (CF_2)_p]C_xF_{2x+1} \qquad (IV)$$

where m and n independently=0-10, p=0-3, and x=1-5. Preferred members of this class include compounds where n=0-1, m=0-1, and x=1.

Other examples of useful perfluoro(alkyl vinyl ethers) include $$CF_2=CFOCF_2CF(CF_3)O(CF_2O)_mC_nF_{2n+1} \quad (V)$$

where n=1-5, m=1-3, and where, preferably, n=1.

If copolymerized units of PAVE are present in fluoroelastomers employed in the invention, the PAVE content generally ranges from 25 to 75 weight percent, based on the total weight of the fluoroelastomer. If perfluoro(methyl vinyl ether) is used, then the fluoroelastomer preferably contains between 30 and 65 wt. % copolymerized PMVE units.

Hydrocarbon olefins useful in the fluoroelastomers employed in the invention include, but are not limited to ethylene and propylene. If copolymerized units of a hydrocarbon olefin are present in the fluoroelastomers, hydrocarbon olefin content is generally 4 to 30 weight percent.

The fluoroelastomer further contains copolymerized units of at least one cure site monomer, generally in amounts of from 0.1-5 mole percent. The range is preferably between 0.3-1.5 mole percent. Although more than one type of cure site monomer may be present, most commonly one cure site monomer is used and it contains at least one nitrile substituent group. Suitable cure site monomers include nitrile-containing fluorinated olefins and nitrile-containing fluorinated vinyl ethers. Useful nitrile-containing cure site monomers include those of the formulas shown below.

$$CF_2=CF-O(CF_2)_n-CN \quad (VI)$$

where n=2-12, preferably 2-6;

$$CF_2=CF-O[CF_2-CFCF_3-O]_n-CF_2-CFCF_3-CN \quad (VII)$$

where n=0-4, preferably 0-2;

$$CF_2=CF-[OCF_2CFCF_3]_x-O-(CF_2)_n-CN \quad (VIII)$$

where x=1-2, and n=1-4; and $$CF_2=CF-O-(CF_2)_n-O-CF(CF_3)CN \quad (IX)$$

where n=2-4.

Those of formula (VIII) are preferred. Especially preferred cure site monomers are perfluorinated polyethers having a nitrile group and a trifluorovinyl ether group. A most preferred cure site monomer is $$CF_2=CFOCF_2CF(CF_3)OCF_2CF_2CN \quad (X)$$

i.e. perfluoro(8-cyano-5-methyl-3,6-dioxa-1-octene) or 8-CNVE.

A first embodiment of this invention is a curable composition comprising A) a fluoroelastomer comprising copolymerized units of a nitrile group-containing cure site monomer; and B) an hydroxylamine derivative of formula $R^1(C(O))_n$ $NHOR^2$ wherein n is 0 or 1; $R^1$ is H, $C(O)R^3$, $C(O)R^4$, $C(O)$ $OR^3$, or $C(O)SR^3$; $R^2$ is H, $C(O)R^3$, or $C(O)OR^3$; $R^3$ is $C_1$-$C_{20}$ alkyl group, aryl, heterocycle, benzyl, 9-fluorenylmethyl, or $CH_2R^4$; and $R^4$ is a fluoroalkyl group, with the proviso that $R^1$ and $R^2$ cannot simultaneously be H. The alkyl, aryl, benzyl or heterocycle groups may contain additional functional groups such as, but not limited to halogen, ether, or amide groups. The fluoroalkyl group has at least 1 of the hydrogen atoms replaced by fluorine and may optionally contain 1 or more oxygen atoms in the chain. $R^1$, $R^2$, $R^3$, or $R^4$ may have 1, 2, or more points of attachment to a hydroxylamine derivative to afford mono-, di-, or poly-hydroxylamine derivatives. Compounds that decompose to form one of these hydroxylamine derivatives may also be employed in the composition of the invention. The hydroxylamine derivative may also be a salt, e.g. benzoyloxyamine hydrochloride. Lastly, the oxygen atom may be replaced by sulfur.

Preferred hydroxylamine derivatives include those wherein n is 0, $R^1$ is H and $R^2$ is $C(O)R^3$; n is 0, $R^1$ is H and $R^2$ is $C(O)OR^3$; n is 0, $R^1$ is $C(O)R^3$ and $R^2$ is H; n is 0, $R^1$ is $C(O)R^4$ and $R^2$ is H; n is 0, $R^1$ is $C(O)R^3$ and $R^2$ is $C(O)OR^3$; and n is 0, $R^1$ is $C(O)OR^3$ and $R^2$ is $C(O)OR^3$.

Specific examples of these hydroxylamine derivative curatives include, but are not limited to acetohydroxamic acid, benzyl-N-hydroxycarbamate, tert-butyl N-hydroxycarbamate, benzohydroxamic acid, and N,O-(tert-butoxycarbonyl) hydroxylamine. More preferred is tert-butyl N-hydroxycarbamate. An example of a di-hydroxylamine derivative is succinohydroxamic acid.

It is theorized that these hydroxylamine derivatives act as curing agents by causing the dimerization of polymer chain bound nitrile groups to form oxadiazole rings, thus crosslinking the fluoroelastomer. The hydroxylamine derivatives are less volatile than curatives such as hydroxylamine, making the derivatives less likely to be fugitive during mixing and shaping processes.

In order to be useful as either the major, or as the only curative for these fluoroelastomers, the level of hydroxylamine derivative should be about 0.05 to 7 parts hydroxylamine derivative per 100 parts fluoroelastomer, preferably about 0.1 to 3 parts hydroxylamine derivative per 100 parts fluoroelastomer, most preferably about 0.5 to 2 parts hydroxylamine derivative per 100 parts fluoroelastomer. As used herein, "parts" refers to parts by weight, unless otherwise indicated.

An appropriate level of hydroxylamine derivative can be selected by considering cure properties, for example the time to develop maximum moving die rheometer (MDR) torque and minimum Mooney scorch of the curable compositions. The optimum level will depend on the particular combination of fluoroelastomer and hydroxylamine derivative.

Optionally, a curative accelerator, e.g. a compound that releases ammonia at curing temperatures, may be used in combination with a hydroxylamine derivative. Examples of compounds that release ammonia at curing temperatures are disclosed in U.S. Pat. No. 6,281,296 B1 and U.S. 2011/0009569.

Optionally, another curative commonly employed to crosslink fluoroelastomers having nitrile-group cure sites may be used in addition to the hydroxylamine derivative. Examples of such other curatives include, but are not limited to diaminobisphenol AF, 2,2-bis(3-amino-4-anilinophenyl) hexafluoropropane, mono- or bis-amidines, mono- or bis-amidrazones, mono- or bis-amidoximes, or an organic peroxide plus coagent.

Additives, such as carbon black, fluoropolymer micropowders, stabilizers, plasticizers, lubricants, fillers, and processing aids typically utilized in fluoroelastomer compounding can be incorporated into the compositions of the present invention, provided they have adequate stability for the intended service conditions.

The curable compositions of the invention may be prepared by mixing the fluoroelastomer, hydroxylamine derivative and other components using standard rubber compounding procedures. For example, the components may be mixed on a two roll rubber mill, in an internal mixer (e.g. a Banbury® internal mixer), or in an extruder. The curable compositions may then be crosslinked (i.e. cured) by application of heat and/or pressure. When compression molding is utilized, a press cure cycle is generally followed by a post cure cycle during which the press cured composition is heated at elevated temperatures in excess of 300° C. for several hours.

The curable compositions of the present invention are useful in production of gaskets, tubing, and seals. Such cured articles are generally produced by molding a compounded formulation of the curable composition with various additives under pressure, curing the part, and then subjecting it to a post cure cycle. The cured compositions have excellent thermal stability, steam and chemical resistance. They are particularly useful in applications such as seals and gaskets for manufacturing semiconductor devices, and in seals for high temperature automotive uses.

Other fluoropolymers containing nitrile cure sites, such as fluoroplastics, may be substituted for fluoroelastomers in the compositions of the invention.

The invention is now illustrated by certain embodiments wherein all parts are by weight unless otherwise specified.

EXAMPLES

Test Methods

Cure Characteristics

Cure characteristics were measured using a Monsanto MDR 2000 instrument under the following conditions:
Moving die frequency: 1.66 Hz
Oscillation amplitude: ±0.5 degrees
Temperature: 199° C., unless otherwise noted
Sample size: Disks having diameter of 1.5 inches (38 mm)
Duration of test: 30 minutes
The following cure parameters were recorded:
$M_H$: maximum torque level, in units of dN·m
$M_L$: minimum torque level, in units of dN·m Test specimens were prepared from elastomer compounded with appropriate additives, as described in the formulations listed in the Examples below. Compounding was carried out on a rubber mill. The milled composition was formed into a sheet and a 10 g sample was die cut into a disk to form the test specimen.

Compression set of O-ring samples was determined in accordance with ASTM D395. Mean values are reported.

Volume swell in water was measured at 225° C. in accordance with ASTM D1414.

The following fluoroelastomer polymer was used in the Examples: FFKM—A terpolymer containing 61.8 mole percent units of TFE, 37.4 mole percent units of PMVE and 0.80 mole percent units of 8-CNVE was prepared according to the general process described in U.S. Pat. No. 5,789,489.

Examples 1-2

Curable compositions of the invention were compounded on a two-roll rubber mill in the proportions shown in Table I. The compounded compositions are labeled Example 1 (acetohydroxamic acid, available from Sigma-Aldrich) and Example 2 (benzyl-N-hydroxycarbamate, available from Sigma-Aldrich) in Table I. Cure characteristics of the compounded compositions are also shown in Table I.

O-rings were made by press curing the curable composition of Example 1 at a temperature of 199° C. for 21 minutes and the curable composition of Example 2 at a temperature of 199° C. for 25 minutes. Both sets of o-rings were then post-cured in a nitrogen atmosphere at a temperature of 305° C. for 26 hours after a slow temperature ramp up from room temperature. Compression set values and volume swell are reported in Table I.

In order to compare volume swells of the compositions of the invention with a prior art composition, o-rings were made from a similar compound, but containing 0.25 phr urea as curative. After only 168 hours of exposure to 225° C. water, the urea cured o-rings exhibited a 15.7% volume swell.

TABLE I

|  | Example 1 | Example 2 |
|---|---|---|
| Formulation (phr)[1] | | |
| FFKM | 100 | 100 |
| Carbon Black MT N990 | 30 | 30 |
| Acetohydroxamic acid | 0.57 | 0 |
| Benzyl-N-hydroxycarbamate | 0 | 1.27 |
| Cure Characteristics | | |
| $M_L$ (dN·m) | 3.91 | 1.5 |
| $M_H$ (dN·m) | 9.51 | 4.38 |
| Compression set, 300° C., 70 hours, 15% compression, % | 71.2 | 84.1 |
| Volume swell, 336 hours, % | 17.9 | 11.8 |

[1]Parts per hundred parts fluoroelastomer

What is claimed is:

1. A curable composition comprising:
    A. a fluoroelastomer comprising copolymerized units of a nitrile group-containing cure site monomer; and
    B. an hydroxylamine derivative of formula $R^1(C(O))_n NHOR^2$ wherein n is 0 or 1; $R^1$ is H, $C(O)R^3$, $C(O)R^4$, $C(O)OR^3$, or $C(O)SR^3$; $R^2$ is H, $C(O)R^3$, or $C(O)OR^3$; $R^3$ is $C_1$-$C_{20}$ alkyl group, aryl, heterocycle, benzyl, 9-fluorenylmethyl, or $CH_2R^4$; and $R^4$ is a fluoroalkyl group, with the proviso that $R^1$ and $R^2$ cannot simultaneously be H.

2. A curable composition of claim 1 wherein n is 0; $R^1$ is H and $R^2$ is $C(O)R^3$.

3. A curable composition of claim 1 wherein n is 0; $R^1$ is H and $R^2$ is $C(O)OR^3$.

4. A curable composition of claim 1 wherein n is 0; $R^1$ is $C(O)R^3$ and $R^2$ is H.

5. A curable composition of claim 1 wherein n is 0; $R^1$ is $C(O)R^4$ and $R^2$ is H.

6. A curable composition of claim 1 wherein n is 0; $R^1$ is $C(O)R^3$ and $R^2$ is $C(O)OR^3$.

7. A curable composition of claim 1 wherein n is 0; $R^1$ is $C(O)OR^3$ and $R^2$ is $C(O)OR^3$.

8. A curable composition of claim 1 wherein the hydroxylamine derivative is selected from the group consisting of acetohydroxamic acid, benzyl-N-hydroxycarbamate, tert-butyl N-hydroxycarbamate, benzohydroxamic acid, N,O-(tert-butoxycarbonyl)hydroxylamine, succinohydroxamic acid, and benzoyloxyamine hydrochloride.

9. A curable composition of claim 1 further comprising a curative accelerator.

10. A cured article formed from the composition of claim 1.

* * * * *